(12) United States Patent
Vanderminden

(10) Patent No.: US 7,204,509 B1
(45) Date of Patent: Apr. 17, 2007

(54) BAR CART

(75) Inventor: William M. Vanderminden, Middle Granville, NY (US)

(73) Assignee: Telescope Casual Furniture Company, Granville, NY (US)

( * ) Notice: Subject to any disclaimer, the term of this patent is extended or adjusted under 35 U.S.C. 154(b) by 431 days.

(21) Appl. No.: 09/126,194

(22) Filed: Jul. 30, 1998

(51) Int. Cl.
*B62B 1/06* (2006.01)

(52) U.S. Cl. .................. 280/652; 280/47.12; 280/47.35

(58) Field of Classification Search .............. 280/651, 280/652, 659, 35, 640, 645, 40, 47.12, 47.17, 280/47.18, 47.19, 47.33, 47.35, 30, 79.11, 280/79.2, 79.4; 108/157.17, 157.15, 187, 108/180, 60; 126/41 R
See application file for complete search history.

(56) References Cited

U.S. PATENT DOCUMENTS

| | | | | |
|---|---|---|---|---|
| 429,463 A | * | 6/1890 | Martin | 280/47.19 |
| 892,083 A | * | 6/1908 | Rawlinson | 280/35 |
| 912,035 A | * | 2/1909 | Schaefle | 280/47.35 |
| 1,087,878 A | * | 2/1914 | Harrah | 280/79.3 |
| 1,455,395 A | * | 5/1923 | Exum | 280/47.35 |
| 1,563,057 A | * | 11/1925 | Williams | 280/79.3 |
| 1,585,834 A | * | 5/1926 | Drinkwater | 296/22 |
| 1,733,029 A | * | 10/1929 | Plant | 108/189 |
| 1,968,273 A | * | 7/1934 | Wegner | 280/79.3 |
| 2,319,613 A | * | 5/1943 | Lichstern et al. | 312/2 |
| 2,670,031 A | * | 2/1954 | Melges | 155/124 |
| 2,720,402 A | * | 10/1955 | Puy et al. | 280/641 |
| 2,805,110 A | * | 9/1957 | Carlbom | 311/39 |
| D182,651 S | * | 4/1958 | Frick | D14/3 |
| 2,841,407 A | * | 7/1958 | Arnao | 280/36 |
| 2,848,732 A | * | 8/1958 | Huff | 280/79.11 |
| 2,856,253 A | * | 10/1958 | Flynn | 280/47.35 |
| 2,886,186 A | * | 5/1959 | Hamilton | 280/47.35 |
| D188,315 S | * | 7/1960 | Frick | D14/3 |
| D190,766 S | * | 6/1961 | Chiarello | D56/4 |
| 3,013,670 A | * | 12/1961 | Mayer | 211/148 |
| 3,099,356 A | * | 7/1963 | Burnett | 211/132 |
| 3,215,096 A | * | 11/1965 | Holtz | 108/111 |
| D203,200 S | * | 12/1965 | Klein et al. | D33/14 |
| 3,271,044 A | * | 9/1966 | Bosko et al. | 280/79.3 |
| 3,291,501 A | * | 12/1966 | Stelniceanu | 280/36 |
| 3,294,412 A | * | 12/1966 | Good | 280/43.13 |

(Continued)

FOREIGN PATENT DOCUMENTS

| | | |
|---|---|---|
| JP | 53-55105 | 10/1951 |
| JP | 55-127624 | 3/1954 |
| JP | 53-55105 | 5/1978 |
| JP | 55-127624 | 9/1990 |
| JP | 8-79915 | 3/1996 |
| JP | 10-174201 | 6/1998 |

*Primary Examiner*—Christopher R. Ellis
*Assistant Examiner*—Bridget L. Avery
(74) *Attorney, Agent, or Firm*—Francis C. Hand; Carella, Byrne et al.

(57) ABSTRACT

The bar cart is composed of individual components to be assembled and readily disassembled in a knock-down manner. A body frame is made of four individual skeletal rectangular frames which are interconnected in spaced apart relation. Spacers between the individual frames of the body frame fit into slots in vertical plates on the leg frames to provide for a rigid connection between the body frame and the two leg frames. A table top fits onto outstanding arms of the leg frames and interlocks with the arms to provide a rigid structure. Guides are provided in the body frame to define compartments for receiving bottles and containers as well as to define a recess for receiving a cooler. The bar cart is transportable via wheels and is disassembled without tools into a compact condition for storage in a minimum of space.

21 Claims, 4 Drawing Sheets

U.S. PATENT DOCUMENTS

| | | | | |
|---|---|---|---|---|
| 3,295,475 A | * | 1/1967 | McClellan | 108/153 |
| 3,498,628 A | * | 3/1970 | Ferneau et al. | 280/641 |
| 3,731,639 A | * | 5/1973 | Schliemann et al. | 108/157.17 |
| D247,169 S | * | 2/1978 | Sheeley et al. | D34/21 |
| D252,563 S | * | 8/1979 | Vredenburg | D34/13 |
| 4,236,462 A | * | 12/1980 | Berthier et al. | 108/177 |
| 4,522,130 A | * | 6/1985 | Worthington | 108/159 |
| 4,690,417 A | * | 9/1987 | Betts et al. | |
| D293,148 S | * | 12/1987 | Wedel | D34/21 |
| 4,865,346 A | * | 9/1989 | Carlile | 280/654 |
| 4,895,068 A | * | 1/1990 | Hanagan et al. | 99/357 |
| 4,895,131 A | * | 1/1990 | Overholser | 126/41 R |
| 4,998,023 A | * | 3/1991 | Kitts | 280/47.35 |
| 5,011,240 A | * | 4/1991 | Kelley et al. | 312/249.12 |
| 5,048,857 A | * | 9/1991 | Stevens | 280/651 |
| 5,083,805 A | * | 1/1992 | Monch et al. | 280/47.35 |
| 5,085,447 A | * | 2/1992 | Audibert | 280/30 |
| 5,154,441 A | * | 10/1992 | White et al. | 280/645 |
| 5,308,012 A | * | 5/1994 | Fuller | 242/557 |
| 5,348,325 A | * | 9/1994 | Abrams | 280/40 |
| 5,425,545 A | * | 6/1995 | McCusker | 280/30 |
| 5,464,236 A | * | 11/1995 | Benting et al. | 280/30 |
| 5,479,866 A | * | 1/1996 | Rae | 108/44 |
| 5,518,258 A | * | 5/1996 | Cox | 280/30 |
| D371,879 S | * | 7/1996 | Linder | D34/21 |
| 5,635,805 A | | 6/1997 | Ibaraki et al. | |
| 5,642,898 A | * | 7/1997 | Wise | 280/652 |
| 5,653,457 A | * | 8/1997 | Marmer et al. | 280/30 |
| 5,695,205 A | * | 12/1997 | Liu | 280/79.2 |
| 5,730,452 A | * | 3/1998 | Fields | 280/47.35 |
| 5,791,331 A | * | 8/1998 | Stewart | 126/41 R |
| 5,839,739 A | * | 11/1998 | Shannon et al. | 280/47.35 |
| D405,580 S | * | 2/1999 | Vanderminden | D34/24 |
| 5,913,270 A | * | 6/1999 | Price | 108/101 |
| 5,915,722 A | * | 6/1999 | Thrasher et al. | 280/649 |
| 5,927,745 A | * | 7/1999 | Cunningham | 280/652 |
| 5,931,488 A | * | 8/1999 | Graziano et al. | 280/639 |
| 5,947,492 A | * | 9/1999 | Hallberg, Jr. | 280/47.24 |

* cited by examiner

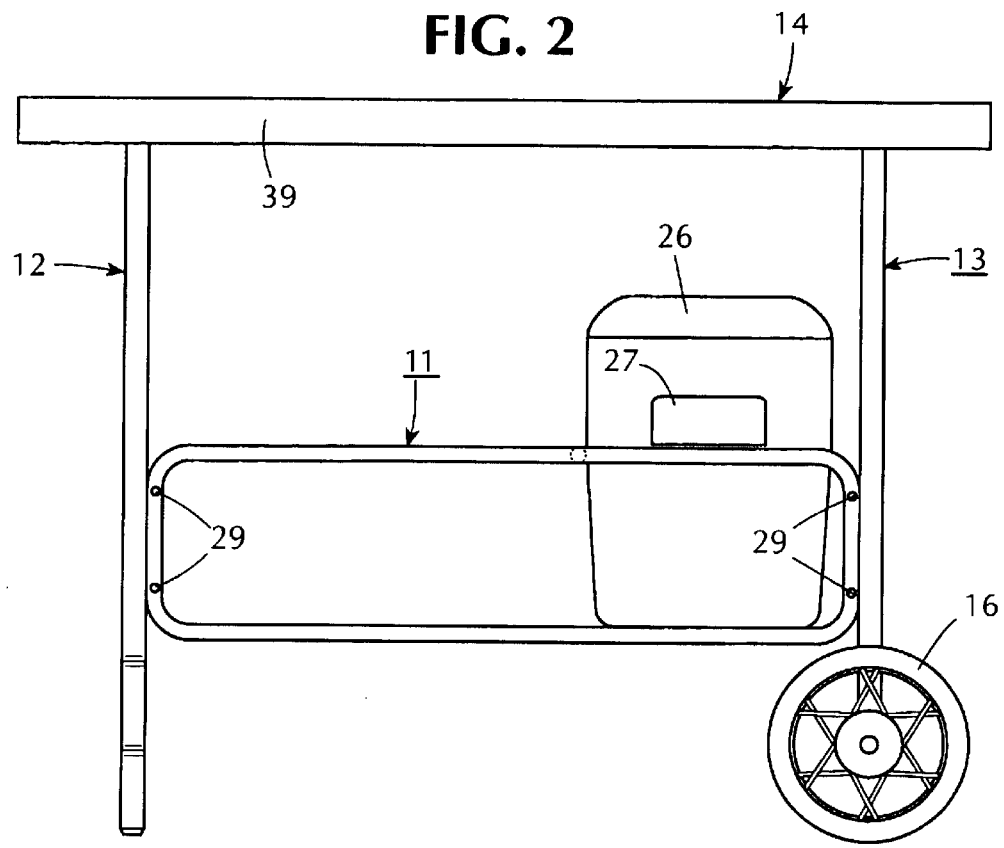
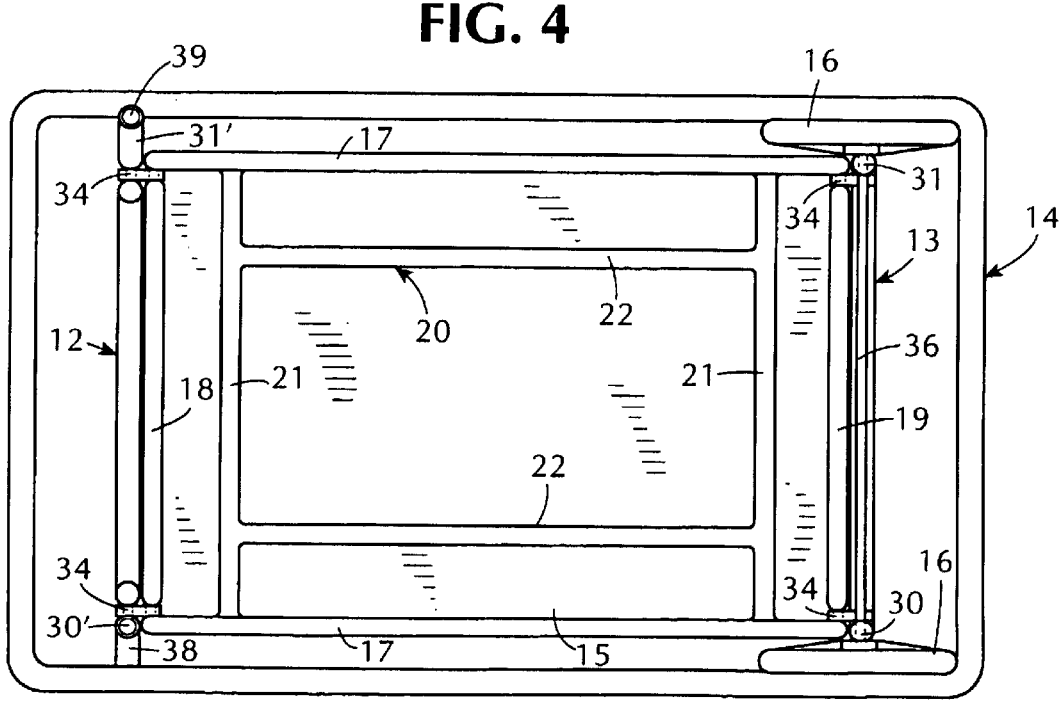

BAR CART

SUMMARY OF THE INVENTION

This invention relates to a bar cart. More particularly, this invention relates to a portable bar cart of knock-down construction.

Heretofore, various types of bar carts and serving carts have been known for indoor use as well as outdoor use. One typical bar/serving cart has been constructed of a skeletal frame having a table top surface which is supported on three or more legs as well as with a pair of wheels for moving the cart from place to place. Handles have also been provided which attach to either a frame surrounding the table top or to the legs in order to enable movement of the cart from place to place. Usually, these carts have a limited table area for serving purposes and have not been particularly sturdy when being moved from place to place especially if moved over a rough surface.

Carts for outdoor use have been known which employ a more robust skeletal frame which can be wheeled from place to place via handles formed with the frame. Typically, these carts are made of unitary construction, that is to say, the individual elements of the frame are welded or otherwise fixed together using tools in a permanent manner. As such, these carts have been relatively bulky for shipment purposes and/or have not been readily storable in a small compact space.

OBJECTS OF THE INVENTION

It is an object of the invention to provide a bar cart of robust construction which can be disassembled for ease of storage as well as assembled from a delivered condition.

It is another object of the invention to provide a bar cart of knock-down construction.

It is another object of the invention to provide a bar cart which is of rigid construction and which is aesthetically pleasing.

It is another object of the invention to provide a bar cart which can be assembled from a minimum of parts.

It is another object of the invention to provide a cart which has a substantial serving area, which is easily moved and which has a pleasing appearance.

Briefly, the invention provides a bar cart which is comprised of a body frame, a pair of leg frames, each of which is releasably connected to the body frame at opposite sides and a table top which is releasably connected to and across the leg frames in vertically spaced relation to the body frame.

In addition, connecting means are integrated in the body frame of each leg frame for releasably connecting each leg frame to the body frame. Each such connecting means includes a vertical plate having a pair of vertical spaced slots on one of the leg frames and the body frame and a pair of vertically disposed spacers on the other one of the leg frames and body frame with the spacers slidably received in the slots of the plate.

The body frame of the cart is a skeletal structure and is of rectangular box-shape. As such, the body frame is particularly robust and rigid. In this respect, the body frame includes four rectangular frames each of which defines one side of the body frame with each rectangular frame being vertically disposed. In addition, the vertically disposed rectangular frames are interconnected to each other and spaced from each other via the spacers of the connecting means.

Each leg frame is constructed to have a pair of horizontal outwardly disposed arms on which the table top rests. In addition, one of the leg frames is provided with a pair of wheels to facilitate movement of the assembled bar cart from place to place. The table top includes a peripheral edge of U-shaped cross-section which slidably receives an end of each arm of a respective leg frame in a slide fit manner so as to secure the table top to the leg frames.

The body frame is also provided with a pair of guides on two opposite sides in order to define a recess with an end frame to receive a cooler or the like therein. A horizontally disposed shelf is also removably mounted in the body frame. Depending upon the size and shape of a cooler mounted on the bar cart, the cooler may be seated directly on the shelf and held in place by the guides. Alternatively, the cooler may be provided with handles which project from opposite ends so as to be supported on upper surfaces of the body frame without resting directly on the shelf.

The individual components of the bar cart, namely the body frame, two leg frames and table top are of a construction to be shipped in a compact flattened condition in a shipping carton and to be assembled without the need for tools. The leg frames are simply interfitted with the body frame and the table top is manipulated into place on top of the arms of the leg frames in an inter-fitted manner. Once assembled, the bar cart is of robust rigid construction.

The table top bar cart provides a relatively large surface area for receiving trays, plates, glasses, bottles, containers and the like. Further, because the body frame is of robust rigid construction, the entire bar cart, when assembled has a sufficiently rigid characteristic so as to be wheeled from place to place without detrimental vibration. That is to say, the bar cart able to support various items on the table top during transport without a sense of looseness in the cart.

The cart may also be provided with a fabric strip peripherally about the leg frames and at least one side of the body frame to screen off any items which are placed on the shelf under the table top. Any suitable means may be provided to secure the opposite ends of the fabric strip in order to hold the fabric strip about the leg frames and body frame. For example, use may be made of a strap which extends between opposite ends of the fabric strip.

BRIEF DESCRIPTION

These and other objects and advantages of the invention will become more apparent from the following detailed description taking in conjunction with the accompanying drawings wherein:

FIG. 2 illustrates a side view of the bar cart and cooler of FIG. 1;

FIG. 4 illustrates a bottom view of the bar cart of FIG. 1;

DETAILED DESCRIPTION

Figure 1:
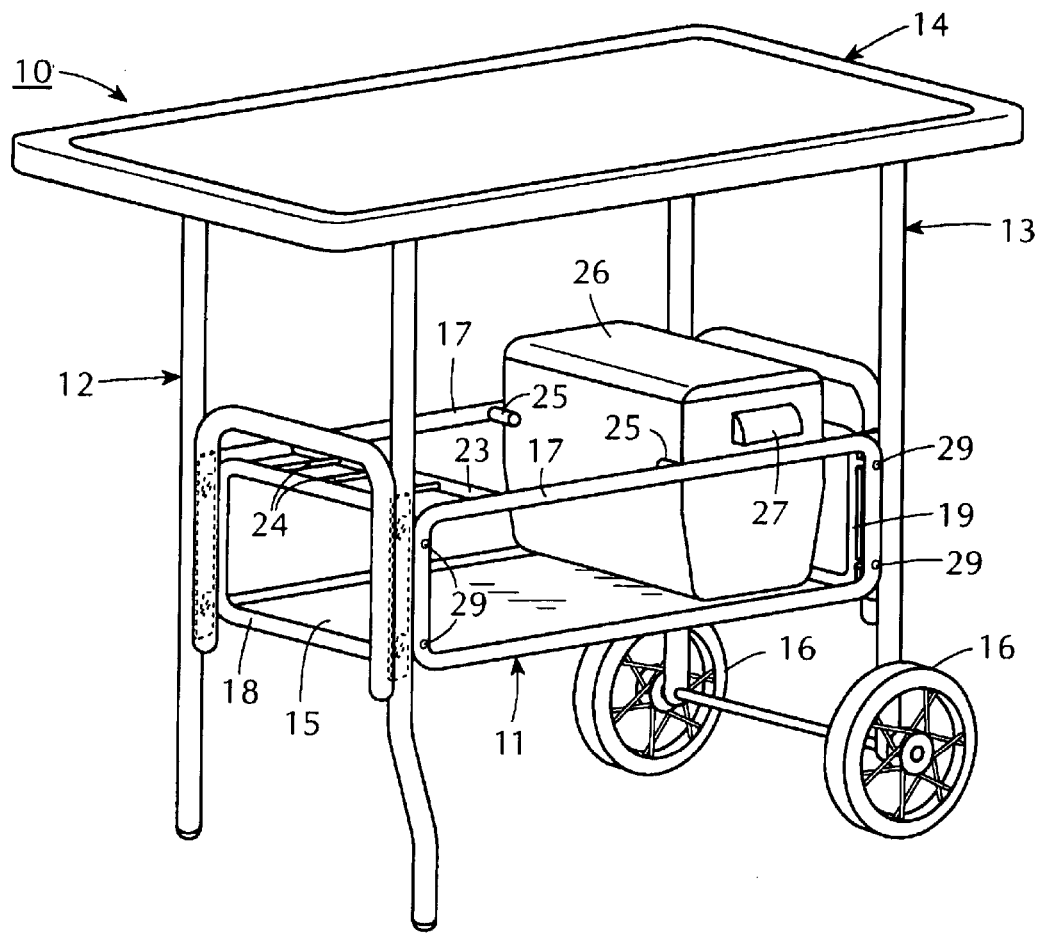
FIG. 1 illustrates a perspective view of an assembled bar cart and cooler in accordance with the invention.

Referring to FIG. 1, the bar cart 10 is constructed in a knock-down manner with a minimum of components. In this respect, the bar cart 10 includes a body frame 11, a pair of leg frames 12, 13 and a table top 14. In addition, the bar cart 10 is provided with a shelf 15 which is removably mounted in the body frame 11. Still further, one leg frame 13 is provided with a pair of wheels 16 to facilitate movement of the bar cart 10 along a surface.

Figure 5:
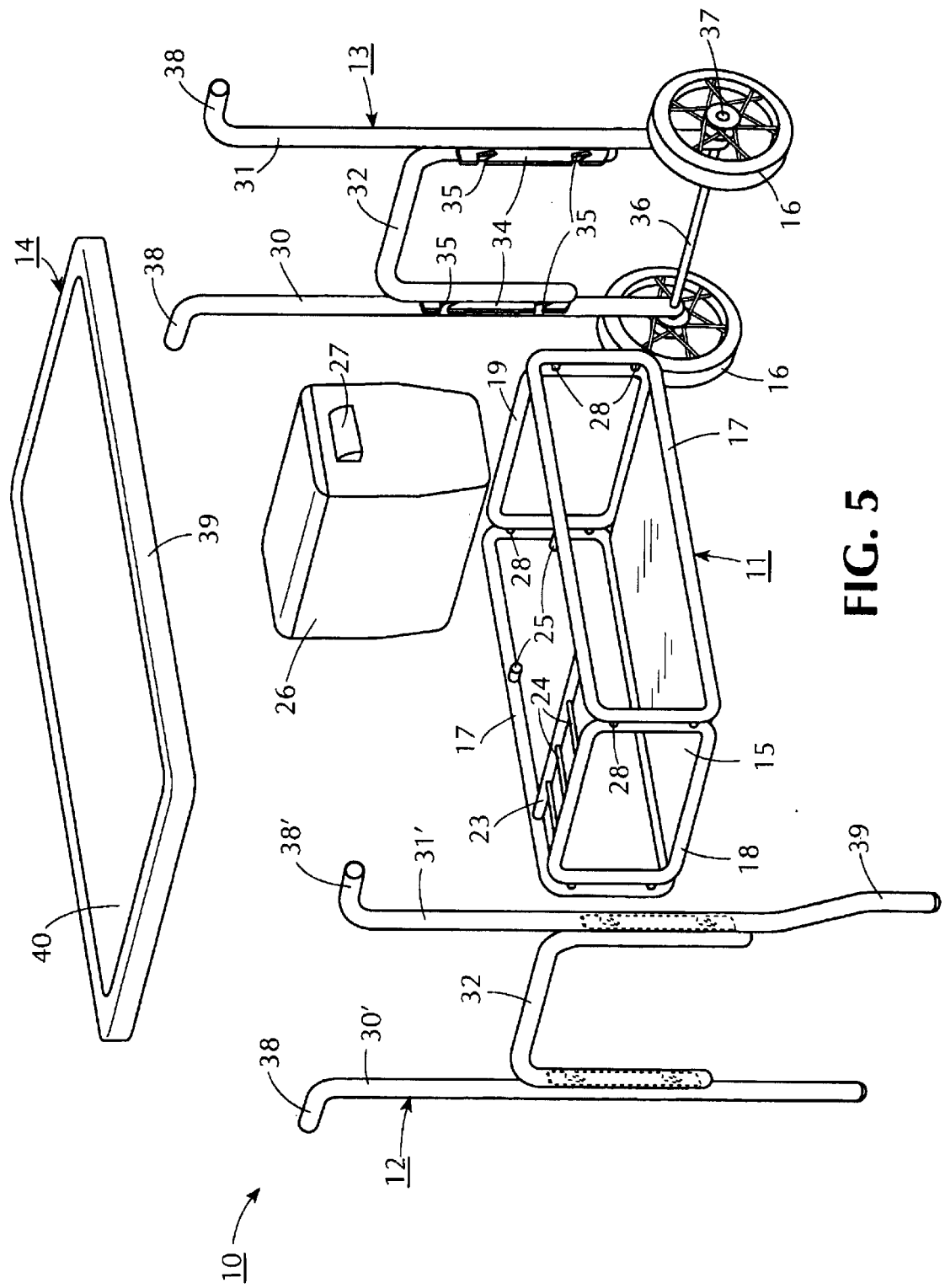
FIG. 5 illustrates an exploded view of the bar cart of FIG. 1.

Referring to FIG. 5, the body frame 11 is a box-shaped skeletal structure having a first pair of parallel vertically disposed rectangular frames 17 defining a pair of sides of the body frame 11 and a second pair of parallel vertically disposed rectangular frames 18, 19 defining a pair of ends of the body frame 11.

Figure 6:
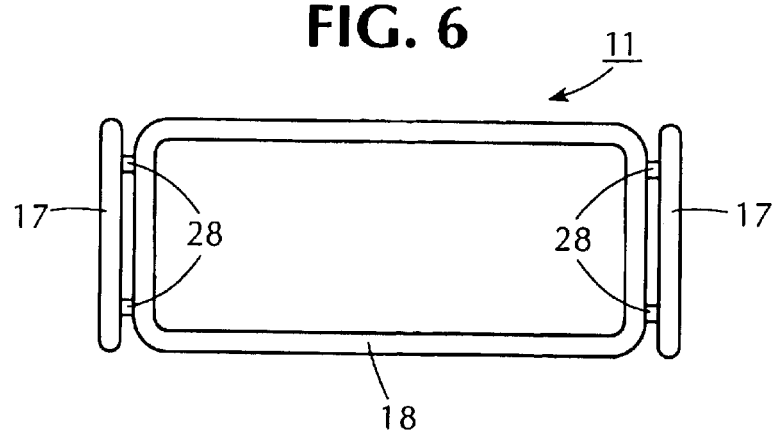
FIG. 6 illustrates an end view of the body frame of the bar cart.

The rectangular frames 17, 18, 19 of the body frame 11 are constructed in a similar manner except for size. For example, as shown in FIGS. 5 and 6, the end frame 18 is formed of a single tube which is shaped into a rectangle with one end of the tube telescoping into the opposite end of the tube in a manner not shown. The remaining frames 17, 19 are made in a similar manner. Each frame 17, 18, 19 is made of aluminum or any other suitable manner and is provided with a powder-coated paint.

Referring to FIG. 4, a shelf support 20 is fixedly secured to the bottom of the body frame 11, for example by welding or any other suitable technique to support the shelf 15. As indicated, the shelf support 20 is formed by a pair of transverse bars 21, each of which is secured to and across the side frames 17 and a pair of longitudinal bars 22, each of which is fitted at the ends into slots (not shown) of the transverse bars 21.

The shelf support 20 may, of course, be made of any other suitable shape and construction.

Referring to FIG. 5, the upper part of the body frame 11 includes a transverse bar 23 which extends across and is interconnected to the side frames 17 as well as a plurality, for example three, rods 24 which extend between the transverse bar 23 and the end frame 18. The bar 23 is spaced from the end frame 18 and the rods 24 are spaced apart so as to define racks or compartments for receiving bottles and the like which are mounted on the shelf 15.

A pair of guides 25 are also mounted on the upper part of the side frames 17 at opposite sides in order to define a recess with the end frame 19, for example to receive a cooler 26 therein. As indicated in FIGS. 1 and 2, the cooler 26 rests on the shelf 15 while being restrained against movement by the guides 25 and the end frame 19. Alternatively, the cooler 26 may be provided with projecting handles 27 which are located such that the cooler 26 can be supported via the handles 27 directly on the upper surfaces of the side frames 16, 17 without resting on the shelf plate 15.

As illustrated in FIGS. 5 and 6, a pair of vertically disposed spacers 28 are secured between each pair of adjacent frames 17, 18 19 of the body frame 11 to space the side frames 17 and end frames 18, 19 apart. In addition, a rivet 29 passes through each two adjacent frames and each spacer 28 in order to secure the side frames 17 and end frames 18, 19 into a rigid construction.

Referring to FIG. 5, one leg frame 13 has a pair of vertical legs 30, 31 which are interconnected by an inverted U-shaped bar 32. In this respect, a pair of rivets (not shown) or the like are passed through the respective legs 30, 31 and bar 32 in order to secure the pieces together in a permanent manner.

Each leg 30, 31 of the leg frame 13 carries a plate 34 which is sandwiched between the leg 30, 31 and the U-shaped bar 32 and permanently fixed in place by rivet 33 which pass through the leg 30, 31 plate 34 and bar 32. Each plate 34 is vertically disposed and has a pair of slots 35 each of which has a horizontal entry portion and an angularly downwardly directed portion. Each slot 35 is sized to receive a spacer 28 of the body frame 11 in order to connect the leg frame 13 to the body frame 11 as indicated in FIG. 1. The slots 35 are spaced apart at the same spacing as the spacers 29.

After the spacers 29 on one end of the body frame 11 are inserted into the horizontal portions of the respective slots 35, the body frame 11 is pushed downwardly so as to more securely engage the body frame 11 with the leg frame 13.

As illustrated in FIG. 5, the leg frame 13 carries an axle 36 at the lower end in fixed relation. The wheels 16 are mounted in rotatable fashion on the ends of the axle 36 and are held thereon by hub caps 37 in suitable manner as is known.

Each leg 30, 31 of the leg frame 13 is provided with a horizontal outwardly disposed arm 38, 38' upon which the table top 14 is able to rest. The arm 38' on one leg 31 is longer than the other arm 38 and extends a greater horizontal distance than the arm 38 on the other leg 30 so that a the table top 14 projects a greater distance from the leg frame 13 on that side. In this way, the table top 14 provides a shelf. By way of example, the arm 38' may extend 6 inches from the side of the leg 31 while the arm 38 extends 2½ inches from the side of the leg 30. The provision of a shelf to at least one side of the bar cart 10 permits a person to stand close to the table top 14 without stepping on the bar cart 10 and also permits a bar stool to be placed adjacent to the table top 14 for seating purposes.

As illustrated in FIG. 4, the leg frames 12, 13 and, particularly, the wheel 16, are disposed within the projected plane of the table top 14. The table top 14 is provided with a peripheral edge 39 of U-shaped cross-section to slidably receive an end of each arm 38 of the leg frames 12, 13 therein.

As illustrated in FIG. 1, the wheels 16 are to the outside of the leg frame 13.

Figure 3:
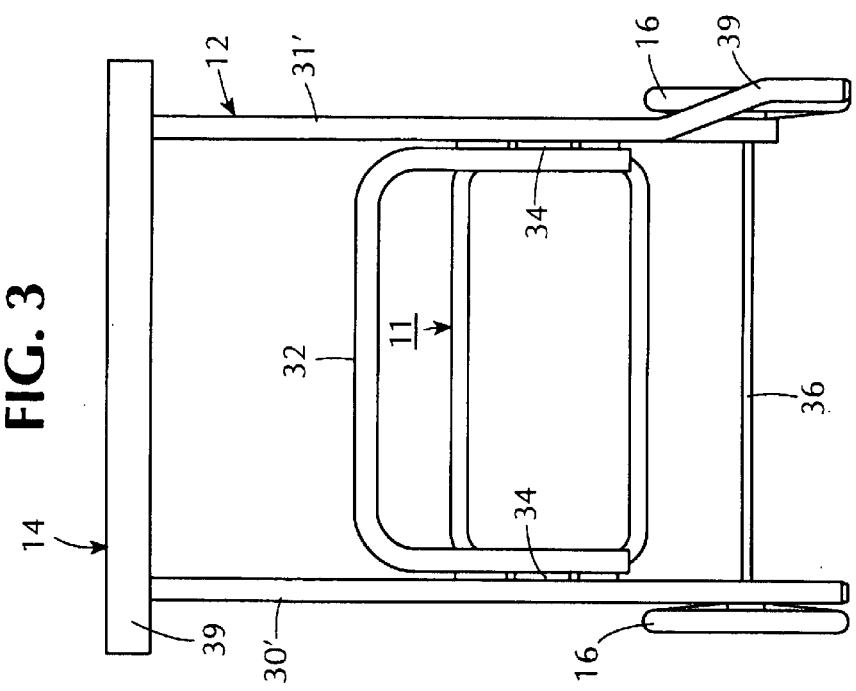
FIG. 3 illustrates an end view of the bar cart of FIG. 1.

Referring to FIG. 5, the wheelless leg frame 12 is of similar construction as the opposite wheeled leg frame 13 and like reference characters indicate like parts as above. Since the leg frame 12 does not include wheels, the legs 30', 31' are of greater length than the legs 30, 31 of the opposite leg frame 13 to extend to a support surface. In addition, as shown in FIG. 3, the leg 31' which has the longer arm 38' is provided with an offset portion 39 at the lower end to further stabilize the cart 10 against tipping. The offset is approximately equal to the length of the shorter arm 38, that is, about 2½ inches.

The leg frame 12 is mounted on the body frame 11 in a similar fashion as the opposite leg frame 13.

Referring to FIG. 5, in order to initially assemble the bar cart 10, the body frame 11 is first connected to one leg frame 12, 13 and then to the other leg frame 12, 13. For example, the spacers 29 adjacent the end frame 18 are first inserted into the slots 35 of the plates 34 on the leg frame is with the axle 36. Next, the spacers 29 at the opposite end frame 19 (the end with the bottle rack) are inserted into the slots 35 of the plates 34 on the wheeled leg frame 13. The body frame 11 is then pressed downwardly relative to the leg frames 12, 13 in order to secure a firm connection between the spacers 29 and the plates 34.

Next, the wheels 16 are mounted on the axle 36 and fixed in place by the hub caps 37 for rotation about the axle.

Next, the table top 14 is mounted on the arms 38 of the leg frames 12, 13 to lock the frames 11, 12, 13 together in a rigid manner. In this respect, the U-shaped edge 39 on one side of the table top 14 is fitted under the arms 38 on one side of the bar cart and then the opposite side is snapped into place over the arms 38 on the opposite side of bar cart. As indicated in FIG. 1, the ends of the table top 14 project beyond the leg frames 12, 13 in order to provide a shelf on those ends of the bar cart 10 in addition to the shelf provided to the one side of the bar cart 10.

The table top 14 may be made of various materials. For example, the table top 14 may be provided with an insert 40 of plastic or tempered glass with various means provided for mounting the insert 40 within the peripheral edge 39.

The shelf 15 which is used in the bar cart 10 may be of any suitable material such as plastic, tempered glass and the like.

Because of the inherent rigidity of the parallelogram arrangement of each side frame 17 and end frame 18, 19, the body frame 11 is of particularly rigid construction to resist bending and twisting. Further, the height of the body frame 11 further enhances the dimensional stability of the bar cart 10. By way of example, the body frame 11 has a height of 10 inches, a width of 21 inches and a length of 32 inches. The rigidity of the body frame 11 is further enhanced by the shelf support 20. The height of the bar cart 10 to the surface of the table top 14 is 38 inches. The surface area provided by the table top 14 is 30 inches×48 inches.

Figure 7:
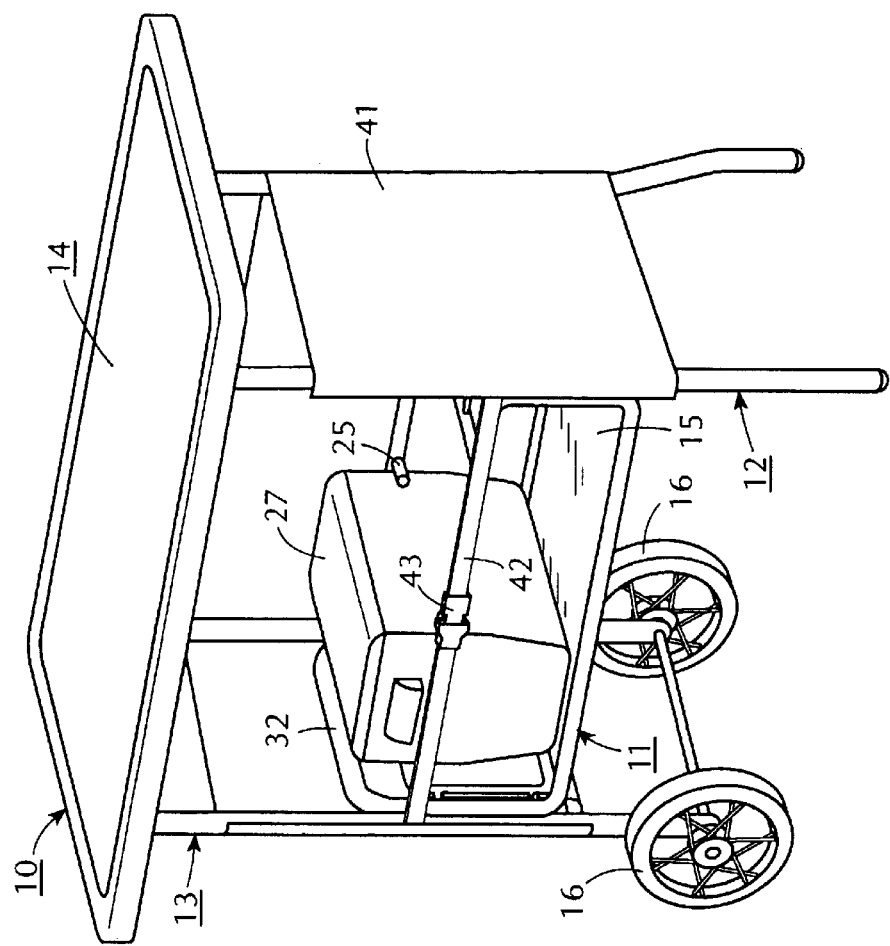
FIG. 7 illustrates a view of the bar cart similar to FIG. 1 with a fabric strip disposed about three sides of the bar cart in accordance with the invention.

Referring to FIG. 7, the bar cart 10 is provided with a fabric strip 41 which is disposed peripherally about the leg frames 12, 13 and the shelf side of the body frame 11. As illustrated, the fabric strip 41 is sized to hide the items placed on the shelf 15 while at the same time having spaced apart ends which permit access through one side of the bar cart 10 to the items on the shelf 15. Typically, the skirt 41 is applied to the bar cart 10 so that the open side is on the side opposite the shelf side so that a bartender can readily obtain access to the shelf 15 while serving a person seated or standing on the opposite side.

Suitable means are also secured to opposite ends of the fabric strip 41 to hold the strip 41 about the bar cart 10. For example, this means may be in the form of a strap 42 having ends secured as by stitching to the fabric 40 and a buckle arrangement 43 to secure the free ends of the strap 42 together. The strap 42 may be made of a resilient material to impart a tension force in the fabric strip 41 and thereby stretch the fabric 41 to obtain a smooth appearance in the fabric strip 41.

The invention thus provides a bar cart of knock-down construction which can be readily assembled from the respective pieces without the need for tools. Likewise, the bar cart can be disassembled into the individual components without the need of tools. Further, the components of the bar cart can be readily stacked for storage within a minimum of space, for example with the leg frames 12, 13, shelf 15 and table top 14 laid flat on each other and the body frame 11 on top of these components.

The invention further provides a bar cart which is readily portable once assembled via the wheels and which is easily shipped when disassembled and placed in a shipping carton or the like.

The invention further provides a bar cart which can be readily transported from place to place during use. Further, the bar cart provides a substantial storage area, for example for receiving a cooler, bottles, containers and the like as well as a generous tempered glass top serving area.

What is claimed is:

1. A knock-down portable bar cart comprising
a body frame of rectangular box-shaped skeletal structure, said body frame including a pair of vertically disposed spacers at each corner of said body frame;
a pair of leg frames, each leg frame being releaseably connected to said body frame at an opposite side from the other of said leg frames to support said body frame on a support surface, each leg frame including a vertical plate at each side thereof, each plate having a pair of vertically spaced slots receiving a respective pair of spacers of said body frame to effect a releasable connection between each leg frame and said body frame; and
a table top releaseably connected to and across said leg frames in vertically spaced relation to said body frame.

2. A knock-down portable bar cart as set forth in claim 1 which further comprises a horizontally disposed floor plate removably mounted in said body frame to provide a shelf.

3. A knock-down portable bar cart as set forth in claim 1 which further comprises a pair of wheels on one of said leg frames for rolling on a support surface.

4. A knock-down portable bar cart as set forth in claim 1 wherein each leg frame has a pair of horizontal outwardly disposed arms and said table top rests on said arms.

5. A knock-down portable bar cart as set forth in claim 1 wherein each leg frame has a pair of horizontal outwardly disposed arms and said table top rests on said arms.

6. A knock-down portable bar cart as set forth in claim 2 which further comprises a pair of guides on two opposite sides of said body frame to define a recess with one other side of said body frame to receive a cooler therein.

7. A knock-down portable bar cart as set forth in claim 4 wherein said table top includes a peripheral edge of U-shaped cross-section slidably receiving an end of each arm therein.

8. A knock-down portable bar cart as set forth in claim 5 wherein said table top includes a peripheral edge of U-shaped cross-section slidably receiving an end of each arm therein.

9. A bar cart comprising
a body frame of box-shaped skeletal structure;
a pair of leg frames, each leg frame being disposed at an opposite side of said body frame from the other of said leg frames;
connecting means integrated in said body frame and each leg frame for releaseably connecting each leg frame to said body frame, each said connecting means including a vertical plate having a pair of vertically spaced slots on one of said leg frames and said body frame and a pair of vertically disposed spacers on the other of one of said leg frames and said body frame, said spacers being slidably received in said slots of said plate; and
a table top releaseably connected to and across said leg frames in vertically spaced relation to said body frame.

10. A bar cart as set forth in claim 9 which further comprises a pair of guides on two opposite sides of said body frame to define a recess with one other side of said body frame to receive a cooler therein.

11. A bar cart as set forth in claim 9 wherein each leg frame has a pair of horizontal outwardly disposed arms and said table top rests on said arms.

12. A bar cart as set forth in claim 9 which further comprises a fabric strip disposed peripherally about said leg frames and at least one side of said body frame and means secured to opposite ends of said fabric strip to hold said strip about said leg frames and said one side of said body frame.

13. A bar cart as set forth in claim 9 wherein said body frame includes a first pair of parallel vertically disposed pair of rectangular frames defining a pair of sides of said body frame and a second pair of parallel vertically disposed rectangular frames defining a pair of ends of said body frame.

14. A bar cart as set forth in claim 11 wherein said table top includes a peripheral edge of U-shaped cross-section slidably receiving an end of each arm therein.

15. A knock-down portable bar cart comprising a body frame, said body frame includes including a first pair of parallel vertically disposed pair of rectangular frames defining a pair of sides of said body frame and a second pair of parallel vertically disposed rectangular frames defining a pair of ends of said body frame;

a pair of leg frames, each leg frame being releaseably connected to said body frame at an opposite side from the other of said leg frames to support said body frame on a support surface; and a table top releaseably connected to and across said leg frames in vertically spaced relation to said body frame.

16. A knock-down portable bar cart as set forth in claim 15 which further comprises a pair of vertically spaced spacers secured to and between each pair of adjacent rectangular frames.

17. A knock-down portable bar cart as set forth in claim 16 wherein each leg frame has a vertical plate at each side of said leg frame, each plate having a pair of slots slidably receiving a respective pair of said spacers of said body frame.

18. A knock-down portable bar cart comprising a body frame;

a pair of leg frames, each leg frame being releaseably connected to said body frame at an opposite side from the other of said leg frames to support said body frame on a support surface;

a table top releaseably connected to and across said leg frames in vertically spaced relation to said body frame; and a fabric strip disposed peripherally about said leg frames and at least one side of said body frame and means secured to opposite ends of said fabric strip to hold said strip about said leg frames and said one side of said body frame.

19. A knock-down portable bar cart as set forth in claim 18 wherein said body frame includes a pair of vertically spaced spacers at each corner of said body frame and wherein each leg frame includes a vertical plate at each side thereof, each plate having a pair of vertically spaced slots receiving a respective pair of spacers of said body frame to effect a releasable connection between each leg frame and said body frame.

20. A knock-down portable bar cart as set forth in claim 19 wherein each leg frame has a pair of horizontal outwardly disposed arms with one of said arms being longer than the other arm and said table top rests on said arm.

21. A knock-down portable bar cart as set forth in claim 20 wherein said table top includes a peripheral edge of U-shaped cross-section slidably receiving an end of each arm therein.

* * * * *